US009388253B2

(12) United States Patent
Becker et al.

(10) Patent No.: US 9,388,253 B2
(45) Date of Patent: Jul. 12, 2016

(54) CATALYST COMPOUND FOR TWO-COMPONENT COATING COMPOSITIONS

(75) Inventors: Wiebke Becker, Essen (DE); Katharina Dreger, Duesseldorf (DE); Carmen Flosbach, Wuppertal (DE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 0 days.

(21) Appl. No.: 14/115,571

(22) PCT Filed: May 3, 2012

(86) PCT No.: PCT/US2012/036339
§ 371 (c)(1),
(2), (4) Date: Dec. 30, 2013

(87) PCT Pub. No.: WO2012/151409
PCT Pub. Date: Nov. 8, 2012

(65) Prior Publication Data
US 2014/0106076 A1    Apr. 17, 2014

Related U.S. Application Data

(60) Provisional application No. 61/481,771, filed on May 3, 2011.

(51) Int. Cl.
C08F 4/72   (2006.01)
C08F 4/76   (2006.01)
C08G 18/24  (2006.01)
C09D 175/04 (2006.01)
C08G 18/62  (2006.01)
C08G 18/22  (2006.01)

(52) U.S. Cl.
CPC ... *C08F 4/72* (2013.01); *C08F 4/76* (2013.01); *C08G 18/22* (2013.01); *C08G 18/244* (2013.01); *C08G 18/246* (2013.01); *C08G 18/6229* (2013.01); *C08G 18/6258* (2013.01); *C09D 175/04* (2013.01)

(58) Field of Classification Search
None
See application file for complete search history.

(56) References Cited

U.S. PATENT DOCUMENTS

| | | | | |
|---|---|---|---|---|
| 5,098,952 | A * | 3/1992 | Blasko et al. | 525/123 |
| 6,225,400 | B1 * | 5/2001 | Bartol et al. | 524/590 |
| 6,296,903 | B1 * | 10/2001 | Sapper et al. | 427/195 |
| 6,441,087 | B1 * | 8/2002 | Zhou et al. | 524/590 |
| 6,652,919 | B1 * | 11/2003 | Campbell et al. | 427/407.1 |
| 7,923,113 | B2 | 4/2011 | Dogan et al. | |
| 2002/0032248 | A1 * | 3/2002 | Klinkenberg et al. | 522/6 |
| 2002/0061957 | A1 * | 5/2002 | Tomita et al. | 524/507 |
| 2002/0132909 | A1 * | 9/2002 | Klanica et al. | 524/507 |
| 2006/0247341 | A1 * | 11/2006 | Hsieh et al. | 524/104 |
| 2006/0258801 | A1 * | 11/2006 | Martin et al. | 524/591 |
| 2007/0197727 | A1 | 8/2007 | Lewin et al. | |
| 2008/0234410 | A1 | 9/2008 | Van Engelen et al. | |
| 2009/0312469 | A1 * | 12/2009 | Koziski et al. | 524/147 |

FOREIGN PATENT DOCUMENTS

| | | |
|---|---|---|
| EP | 0677541 A1 | 10/1995 |
| EP | 1193279 A2 | 4/2002 |
| WO | 0192362 A1 | 12/2001 |

OTHER PUBLICATIONS

ISA EPO, International Search Report for Application No. PCT/US2012/036339, dated May 23, 2013.
ISA European Patent Office, International Preliminary Report on Patentability mailed Nov. 14, 2013 for International Application No. PCT/US2012/036339.
European Patent Office, European Office Action for EP Application No. 12722232.1, dated Sep. 15, 2014.

* cited by examiner

*Primary Examiner* — Erma Cameron
(74) *Attorney, Agent, or Firm* — Ingrassia Fisher & Lorenz, P.C.

(57) ABSTRACT

Catalyst compounds for water-based two-component coating compositions include: I) an organo-metal catalyst for a curing reaction between isocyanate groups and functional groups reactive towards isocyanate groups and II) an oligomeric or polymeric binder compound having a glass transition temperature Tg of ≥20° C., measured by DSC (differential scanning calorimetry) at a heating rate of 10 K/min. The glass transition temperature Tg of binder compound II) is above the temperature at which a water-based two-component coating composition comprising the catalyst compound is applied, preferably is at least 10° C., more preferred at least 20° C., above the temperature at which the two-component coating composition is applied.

15 Claims, No Drawings

CATALYST COMPOUND FOR TWO-COMPONENT COATING COMPOSITIONS

CROSS-REFERENCE TO RELATED APPLICATIONS

This application is a U.S. National-Stage entry under 35 U.S.C. §371 based on International Application No. PCT/US2012/036339, filed May 3, 2012 which was published under PCT Article 21(2) and which claims priority to U.S. Application No. 61/481,771, filed May 3, 2011, which are all hereby incorporated in their entirety by reference.

TECHNICAL FIELD

The present disclosure relates to a catalyst compound for two-component coating compositions and to a process for preparing the catalyst compound.

BACKGROUND

Two-component coating compositions based on a hydroxyl-functional binder component and a polyisocyanate cross-linking agent are widely used in vehicle painting and industrial painting, particularly also in vehicle refinishing, owing to the very good technological properties of these coating compositions. The coating compositions are used in both water-based and solvent-based form.

Owing to tighter environmental law requirements, however, it is becoming increasingly necessary to use water-based coating compositions. Of course, paint manufacturers are anxious to provide such water-based coatings, which are also at least on a par with solvent-based paints in terms of technological properties. Some effort was and still is required to this end, as solvent-based paint systems cannot automatically be switched 1:1 to water-based ones. For example, it is in the nature of water-based paints based on polyisocyanate cross-linking agents that secondary reactions occur between the water and the polyisocyanates. Owing to these secondary reactions, surface defects in the applied paint film may in turn occur. In this way, for example, so-called bubbles or pinholes may appear. It is known that the tendency for bubbles to form can be reduced by extending the flash-off time of the applied water-based coating. However, this lengthens the total process time, which in turn is not acceptable for certain applications, for example for vehicle refinishing applications.

A short drying time of the applied coating composition at moderate temperatures, for example from room temperature to approx. 60° C., is also necessary in vehicle refinishing applications. The drying and curing times may be considerably reduced by using catalysts for the cross-linking reaction. However, at the same time the use of catalysts generally also leads to a reduction of the pot life, i.e. to a reduction of the time within which the coating can still be processed and applied faultlessly.

Various approaches are known for eliminating the above-mentioned problem. For example, it is proposed to introduce the catalyst for the reaction between polyisocyanates and binders having groups capable of reacting with polyisocyanates not into the two-component coating composition or the layer of paint resulting therefrom itself, but rather into another layer of paint located thereabove or therebelow. In addition, U.S. Pat. No. 5,578,345 and WO 2007/068683, for example, disclose methods for multi-layer coating, wherein a clear coat composition based on a polyisocyanate cross-linking agent and a hydroxyl- and/or mercapto-functional binder is being applied in a multi-layer construction on a base coat layer which contains a catalyst for the cross-linking reaction in the clear coat. In this case, the catalyst is intended to migrate through the interface between the two coating layers and into the clear coat layer, after application of the clear coat composition, and therein to catalyze the cross-linking reaction. Since the two-component paint itself does not contain a catalyst, satisfactory processing times are achieved. However, a disadvantage of this method is that it can be difficult to control in a purposeful manner the migration of the catalyst into the layer of paint to be cross-linked, for example the layer of clear coat. As a result, over- or under-catalyzing can easily occur, which may for example lead to insufficient through-curing or to an unsatisfactorily long drying time.

Furthermore, it is known from WO 01/92362 to use photo-latent catalysts, for example amines, in coating compositions based on a polyisocyanate cross-linking agent and a mercapto-functional binder. The photo-latent catalyst is inactive in the coating itself and is only activated after the application of high-energy radiation by irradiation. In this way, an extended pot life can also be achieved. However, additional UV-lamp equipment is required for this purpose and sensitisers such as thioxanthones or benzophenones must be used in addition to the photolatent catalysts.

Therefore, there remains a need for curing catalysts for two-component coating compositions allowing to provide a good balance between acceptable processing time (pot life) and short drying time, and in particular a need for curing catalysts for water-based two-component coating compositions based on a binder component which is reactive with polyisocyanates and a polyisocyanate cross-linking agent. Use of the catalyst compound shall result in coats without surface defects in an acceptable total process time of the drying process. In addition, other objects, desirable features and characteristics will become apparent from the subsequent summary and detailed description, and the appended claims, taken in conjunction with the accompanying drawings and this background.

SUMMARY

The various embodiments herein relate to a catalyst compound for two-component coating compositions, in particular for water-based two-component coating compositions comprising:
I) at least one organo-metal catalyst for the curing reaction between isocyanate groups and functional groups reactive towards isocyanate groups and
II) at least one oligomeric or polymeric binder compound having a glass transition temperature Tg of ≥20° C., measured by DSC (differential scanning calorimetry) at a heating rate of 10 K/min.

Preferably a water-based coating composition comprising the above catalyst compound is applied at an application temperature $T_A$, which is below, preferably at least 10° C. below, the glass transition temperature Tg of binder compound II). Accordingly the glass transition temperature Tg of binder compound II), should be above the temperature at which a water-based two-component coating composition is applied (=application temperature $T_A$).

The various embodiments also relate to a process for preparing the above catalyst compound. The process for preparing the catalyst compound above comprises the steps:
1) Preparing binder compound II) in an organic medium by forming a solution or dispersion of the binder compound in one or more organic solvents, 2) Mixing the organic solution or dispersion of the binder compound II) with the catalyst I), and
3) Converting the mixture of catalyst I) and binder compound II) into the aqueous phase, wherein the binder II) is neutralized prior to or during the conversion into the aqueous phase.

DETAILED DESCRIPTION

The following detailed description is merely exemplary in nature and is not intended to limit the embodiments or the application and uses thereof. Furthermore, there is no intention to be bound by any theory presented in the preceding background or the following detailed description.

The term (meth)acrylic as used here and hereinafter should be taken to mean methacrylic and/or acrylic.

Unless stated otherwise, all the molar mass data, number-average molar mass data Mn or weight-average molar mass data Mw stated in the present description are molar masses determined or to be determined by gel permeation chromatography (GPC; divinylbenzene-crosslinked polystyrene as the immobile phase, tetrahydrofuran as the liquid phase, polystyrene standards).

The phrase "groups reactive towards isocyanate groups" used herein in particular means groups capable of addition reaction with isocyanate groups.

The glass transition temperature Tg has been measured by DSC (differential scanning calorimetry) according to standard DIN 53 765 at a heating rate of 10 K/min. The glass transition temperature Tg used herein is the extrapolated end temperature TgEE as defined in standard DIN 53 765.

The catalyst compound used herein is an aqueous compound and particularly suited for use in water-based two-component coating compositions.

Water-based coating compositions are coating compositions, wherein water is used as solvent or thinner when preparing and/or applying the coating composition. Usually, aqueous coating compositions contain 20 to 80% by weight of water, based on the total amount of the coating composition and optionally, up to 15% by weight, preferably, below 10% by weight of organic solvents, based on the total amount of the coating composition.

The handling of two-component coating compositions generally requires mixing together the reactive components shortly before application to avoid premature reaction of the reactive components. The term "shortly before application" is well-known to a person skilled in the art handling two-component coating compositions. The time period within which the ready-to-use coating composition may be prepared prior to the actual use/application depends, e.g., on the pot life of the coating composition.

The pot life is the time within which, once the mutually reactive components of a coating composition have been mixed, the coating composition may still be properly processed or applied and coatings of unimpaired quality can be achieved.

The catalyst compound used herein comprises a combination of catalyst I) and binder compound II) as defined above. The catalyst compound behaves like a latent curing catalyst. It is assumed that catalyst I) is immobilized in the binder compound II) and is thus not or virtually not able to display its catalytic effect on the cross-linking reaction between reactive components of a two-component coating composition. Catalyst I) becomes active only during and/or after film formation of the applied two-component coating composition and/or during curing of the applied two-component coating composition.

The catalyst compound can comprise 0.05 to 20% by weight, preferred 0.1 to 10% by weight, more preferred 1.0 to 5.0% by weight of catalyst I), and 99.95 to 80% by weight, preferred 99.9 to 90% by weight, more preferred 99 to 95% by weight of binder compound II), wherein the % by weight are based on the total amount of the catalyst compound.

Preferably the solids content of the catalyst compound consists of the combination of catalyst I) and binder compound II).

The catalyst compound may contain in addition to the catalyst I) and the binder compound II) water and/or at least one organic solvent. The catalyst compound may contain, for example 40-60% by weight of water and/or organic solvents, based on the total amount of the catalyst compound.

The catalyst I) is an organo-metal compound. Suitable catalysts are all organo-metal compounds capable of accelerating the curing reaction between isocyanate groups and functional groups reactive towards isocyanate groups.

The organo-metal compounds are metal salts and/or complexes of organic compounds. The organic compounds are compounds having 2 to 40 carbon atoms, optionally comprising hetero atoms such as O, N, and S. The catalyst is preferably a metal compound wherein the metal is a metal of groups 3 to 15 of the Periodic Table. The metal salts comprise anions selected from the group of carboxylates. Examples thereof include propionate, butyrate, pentanoate, 2-ethyl hexanoate, naphthenate, oxalate, malonate, succinate, glutamate, and adipate. The catalyst can be a metal compound with an organic ligand where the metal is a metal of groups 3 to 15 of the Periodic Table.

The metal complexes comprise ligands selected from the group of beta-diketones, alkyl acetoacetates, alcoholates, and combinations thereof. Examples thereof include acetyl acetone (2,4-pentanedione), 2,4-heptanedione, 6-methyl-2,4-heptadione, 2,4-octanedione, propoxide, isopropoxide, and butoxide. Preferably, the metal compound is a metal complex. Examples of metal complexes are those with aluminium, titanium, zirconium, and hafnium as metal.

In case of two-component coating compositions containing thiol-functional components the metal is preferably a transition metal. More preferably, the metal is a metal of Period 4 of the Periodic Table, e.g., zirconium or titanium.

In case of two-component coating compositions containing hydroxyl-functional components the metal is preferably tin, zinc, bismuth and zirconium. Most preferred are tin and zirconium.

Examples of metal complexes include aluminium complexed with 2,4-pentanedione, aluminium triacetyl acetonate, zirconium tetraacetyl acetonate, zirconium tetrabutanolate, titanium tetrabutanolate, titanium acetylacetonate, zirconium complexed with 6-methyl-2,4-heptadione, aluminium triisopropoxide, and titanium diisopropoxide bis-2,4(pentadionate) and bismuth octanoate. Those metal complexes are commercially available, for example, under the trade name Tyzor® from DuPont or K-KAT® XC6212 from King Industries or Liovac® 3024 from NRC.

Examples of tin catalysts are organotin carboxylates, e.g. dialkyl tin carboxylates of aliphatic carboxylic acids, such as dibutyl tin dilaurate (DBTL), dibutyltin diacetate, and dibutyltin oxide or dioctyltin oxide.

Catalyst I) can be a single catalyst or a combination of catalysts. Appropriate catalysts are selected depending on the specific curing chemistry to be catalyzed.

The catalyst compound comprises at least one oligomeric or polymeric binder compound having a glass transition temperature Tg of ≥20° C., measured by DSC (differential scanning calorimetry) at a heating rate of 10 K/min, wherein the glass transition temperature Tg of binder compound II) is above the temperature at which a water-based two-component coating composition comprising the catalyst compound is applied.

The glass transition temperature Tg of binder compound II) is ≥20° C., preferably ≥30° C., and is above the temperature at which a water-based two-component coating composition containing the catalyst compound is applied. It is preferably 10° C., more preferred 20° C., above the temperature at which the two-component coating composition is applied. The binder compound II) may have, for example, a glass transition temperature Tg of 20° C. to 70° C., preferably of 30° C. to 65° C. Water-based two-component and other coating compositions are usually applied at room temperature or ambient temperature. Room temperature and ambient temperature are usually in a range of from 10 to 30° C., preferably 15-25° C. for coating applications. Any binder having the above defined Tg is suitable as binder compound II).

Preferably binder compound II) is at least one (meth)acrylic copolymer, at least one polyester or a mixture of both. (Meth)acrylic copolymers are most preferred. Suitable (meth)acrylic copolymers and polyesters are those as described below for binder component A). In particular suitable (meth)acrylic copolymers and polyesters have a hydroxyl number of, e.g., 20-200 mg KOH/g solids, and an acid number of 20-50 mg KOH/g solids. (Meth)acrylic copolymers produced in two stages, as disclosed, for example, in EP 1784463, are also highly suitable as acrylic or methacrylic copolymers.

Generally the binder compound II) should be selected so as to be chemically similar to the main binder of the two-component coating composition to be used in, in order to guarantee good compatibility. Also, those binder compounds II), in particular those (meth)acrylic copolymers should be selected which have a reduced reactivity compared to the reactivity of the main binder. Reduced reactivity can be achieved, for example, by reducing the hydroxyl number of the binder and/or by amending the ratio primary hydroxyl groups:secondary hydroxyl groups.

The catalyst compound contemplated herein is used in two-component coating compositions in an amount that is effective in catalyzing the cross-linking reaction of the coating composition under the conditions of ambient temperature or thermal cure, or to be more precise, in catalyzing the cross-linking reaction of the reactive components under curing conditions. The catalyst compound C) can be used in a two-component coating composition in a proportion of, for example, 1 to 25% by weight, preferably 1 to 10% by weight, based on the total amount of the coating composition. A skilled person can select appropriate proportion of catalyst compound, preferably within the range, dependent on the type and the content of the catalyst I) in the catalyst compound and the reactivity of the coating composition's cross-linking system. The catalyst I) does not or virtually not (only marginally) catalyze the cross-linking reaction directly after having mixed it with the reactive components. In other words, the catalyst I) in the catalyst compound behaves essentially passive as long as the ambient temperature, in particular the temperature of application of the coating composition is below the glass transition temperature Tg of binder compound II). Preferably the Tg of binder compound II) is at least 10° C., more preferred at least 20° C., above the temperature at which the coating composition is applied.

The catalyst compound is produced according to the process contemplated herein. Specifically binder compound II) is prepared in an organic medium by forming a solution or dispersion of the binder compound in one or more organic solvents, mixing the organic solution or dispersion of the binder compound II) with the catalyst I), and converting the mixture of catalyst I) and binder compound II) into the aqueous phase, wherein the binder II) is neutralized prior to or during the conversion into the aqueous phase.

The binder compound II) is produced in the organic medium in a conventional manner. In the preferred case of (meth)acrylic copolymers as binder compound II) the copolymers are produced by radical copolymerization, for example by radical solution polymerization. Radical polymerization is following the usual methods known by a person skilled in the art. The binder compound II) can be made by a one-step or two-step polymerization process. The organic solution or dispersion of the binder compound II), preferably the organic solution or dispersion of the at least one (meth)acrylic copolymer, is then mixed in the organic phase with the catalyst I). After mixing the mixture of catalyst I) and binder compound II) is converted into the aqueous phase. Binder II), preferably the (meth)acrylic copolymer, is neutralized prior to or during the conversion into the aqueous phase. The ionic groups, preferably the carboxyl groups of binder compound II), can be partially or completely neutralized. Suitable neutralizing agents include basic compounds such as tertiary amines, for example, triethylamine, dimethylethanolamine and diethylethanolamine.

Even if not preferred, emulsifiers can also be used, alone or in addition to a hydrophilic modification of the binder compound II) to render the binder compound water-reducable.

The catalyst compound contemplated herein is intended for particular use in water-based two-component coating compositions.

Preferably those water-based two-component coating compositions comprise:
A) at least one cross-linkable binder having at least one functional group reactive towards isocyanate groups,
B) at least one cross-linking agent having at least one free isocyanate group,
C) at least one catalyst compound as defined above.

Components A) and B) which are reactive with each other shall be stored separately and mixed together only shortly before application. Component C) can be either part of component A) and/or B) or a separate component. Component C) cannot be a part of component B), if binder component II) contains functional group reactive towards isocyanate groups. Preferably component C) is part of component A).

Usually the coating compositions comprise 20-80% by weight, preferably 30-70% by weight, of the at least one component A) and 20-80% by weight, preferably 30-70% by weight, of the at least one cross-linking agent B), relative to the entire coating composition.

Component A) of the coating composition comprises monomeric, oligomeric or polymeric compounds with functional groups reactive towards isocyanate groups. These compounds can be compounds with low molar mass defined by empirical and structural formula or oligomeric or polymeric binders. The binders are compounds with a number average molar mass (Mn) of, e.g., 500 to 500,000 g/mole, preferably of 1100 to 300,000 g/mole.

Functional groups reactive towards isocyanate groups are groups with active hydrogen. The functional groups with active hydrogen may be for example hydroxyl groups, thiol groups, primary and/or secondary amino groups or combinations thereof. Compounds with hydroxyl groups and/or thiol groups are preferably used as component A).

The binders with hydroxyl groups are for example the polyurethanes, (meth)acrylic copolymers, polyesters, polyethers and alkyd resins known from polyurethane chemistry to the skilled person, which are used in the formulation of organic solvent based or aqueous coating compositions. They may each be used individually or in combination with one another.

In order to ensure sufficient water dilutability of the binders A) in case of water-based coating compositions, these binders are modified in a suitable manner to render them hydrophilic. The binders A) may be ionically (anionically and/or cationically) and/or non-ionically modified. An anionic modification and an anionic modification in combination with a non-ionic modification is preferred. Preferably, water-dilutable binders A) may contain carboxylic acid groups, sulfonic and/or phosphonic acid groups. Carboxylic acid groups are most preferred.

Examples of suitable polyurethane resins include all polyurethane resins which are suited for water-based coating compositions and known to a skilled person. Examples are polyurethane resins, for example, with a number average molar mass Mn of 500 to 500 000 g/mol, preferably, of 1100 to 300 000 g/mol, most preferably, of 5000 to 300 000 g/mol, an acid value of 5 to 100 mg KOH/g, preferably of 20 to 80 mg KOH/g, and a hydroxyl value of 40 to 400 mg KOH/g, preferably, of 80 to 250 mg KOH/g. Appropriate polyurethane resins which may be used are, for example, prepared by reacting compounds which are reactive with respect to isocyanate groups and polyisocyanates having at least 2 free isocyanate groups per molecule.

The thus obtained polyurethane resins can still be subjected to chain extension to increase the molar mass. For example, NCO-functional polyurethane prepolymers can be reacted with compounds, which are reactive with respect to isocyanate groups. Compounds, which are reactive with respect to isocyanate groups, are in particular compounds with hydroxyl and/or secondary and/or primary amino groups. OH-functional polyurethane prepolymers can be chain extended for example with polyisocyanates.

The polyurethane resins include such resins which are in modified form, for example, as silicon-modified or (meth) acrylated polyurethane resins. Examples of polyurethane resins which may be used are described in U.S. Pat. No. 5,492, 961, U.S. Pat. No. 5,141,987, U.S. Pat. No. 5,556,912, DE-A-41 15 042, U.S. Pat. No. 5,635,559, U.S. Pat. No. 5,691,425, DE-A-42 28 510, U.S. Pat. No. 5,854,337 and U.S. Pat. No. 4,489,135.

Examples of hydroxyl-functional poly(meth)acrylate resins include all (meth)acrylic copolymers which are suited for water-based coating compositions and known to a skilled person. For example, they can be those with a number average molar mass Mn of 1000-20000 g/mol, preferably, of 1100-15000, an acid value of 5-100 mg KOH/g, preferably, of 15-50, and a hydroxyl value of 40-400 mg KOH/g, preferably, of 60-200 mg KOH/g. The (meth)acrylic copolymers can also be prepared in the presence of different binders, e.g., in the presence of oligomeric or polymeric polyester and/or polyurethane resins.

The poly(meth)acrylate copolymer can be prepared by free-radical polymerization of polymerizable, olefinically unsaturated monomers, optionally, in presence of oligomeric or polymeric polyester and/or polyurethane resins. Free-radically polymerizable, olefinically unsaturated monomers, which may be used are monomers which, in addition to at least one olefinic double bond, also contain further functional groups and monomers which, apart from at least one olefinic double bond, contain no further functional groups. Further functional groups may be, for example, urea, hydroxyl, carboxyl, sulfonic acid, silane, amine, amide, acetoacetate or epoxy groups. It would be clear that only those functional groups can be combined in the poly(meth)acrylate copolymer which do not tend to self-crosslink.

Examples of (meth)acrylic copolymers which are suited for the water-based coating compositions are one-stage or two-stage copolymers as described, e.g. in WO 2006/026671 and WO 2006/039430.

Examples of polyester resins which can be used as binder component A) include all polyester resins that are suited for organic solvent-based coating compositions, for example, hydroxyfunctional polyesters with a number average molar mass of 500-10,000 g/mol, preferably, of 700-8000 g/mol, an acid value of 0-50 mg KOH/g, and a hydroxyl value of 40-400 mg KOH/g, preferably, of 50-200 mg KOH/g. The polyesters may be saturated or unsaturated and they may optionally be modified with fatty acids. The polyesters are produced using known processes with elimination of water from polycarboxylic acids and polyalcohols or transesterification reaction of e.g dimethylesters of dicarboxylic acids with polyalcohols.

Particularly suitable polyesters are polyester oligomers having a number average molecular weight (Mn) of 200-3, 000, preferably of 400-2,000, and a polydispersity of less than 1.7.

Thiol-functional compounds A) that can be used in the coating composition are compounds in the form of low molar mass compounds defined by empirical and structural formula with molar mass in the range of 200 to 600 or oligomeric or polymeric binders. The binders are compounds with a number average molar mass (Mn) of, e.g., 500 to 500,000 g/mole, preferably of 1100 to 300,000 g/mole.

Thiol-functional compounds A) that can be used in the coating composition are esters of a thiol-functional carboxylic acid with a polyol, such as esters of 2-mercaptoacetic acid, 3-mercaptopropionic acid, 2-mercapto-propionic acid, 11-mercaptoundecanoic acid, and mercaptosuccinic acid. Examples of such esters include pentaerythritol tetrakis (3-mercaptopropionate), pentaerythritol tetrakis (2-mercaptoacetate), trimethylol propane tris (3-mercaptopropionate), trimethylol propane tris (2-mercaptopropionate), and trimethylol propane tris (2-mercaptoacetate). A further example is a compound of a hyperbranched polyol core based on a starter polyol, e.g. trimethylol propane and dimethylol propionic acid, which is subsequently esterified with 3-mercaptopropionic acid and isononanoic acid. Those compounds are described for example in EP 0 448 224.

The compounds A) can be used individually or in combination.

The coating composition can also contain reactive monomers of low molecular weight, so-called reactive thinners, which are able to act as a solvent and can react with the cross-linking components. Examples of those compounds are hydroxy-, thiol- or amino-functional reactive thinners.

The coating composition contains polyisocyanates with free isocyanate groups as cross-linking agents (component B). Examples of the polyisocyanates are any organic polyisocyanates with aliphatically, cycloaliphatically, araliphatically and/or aromatically bound free isocyanate groups. The polyisocyanates are liquid at room temperature or become liquid through the addition of organic solvents. At 23° C., the polyisocyanates generally have a viscosity of 1 to 6,000 mPas, preferably, above 5 and below 3,000 mPas.

The preferred polyisocyanates are polyisocyanates or polyisocyanate mixtures with exclusively aliphatically and/or cycloaliphatically bound isocyanate groups with an average NCO functionality of 1.5 to 5, preferably 2 to 4.

Examples of particularly suitable polyisocyanates are what are known as "paint polyisocyanates" based on hexamethylene diisocyanate (HDI), 1-isocyanato-3,3,5-trimethyl-5-isocyanatomethyl-cyclohexane (IPDI) and/or bis(isocyanatocyclohexyl)-methane and the derivatives known per se, containing biuret, allophanate, urethane and/or isocyanurate groups of these diisocyanates which, following production, are freed from surplus parent diisocyanate, preferably by distillation, with only a residue content of less than 0.5% by weight. Triisocyanates, such as, triisocyanatononan can also be used.

Sterically hindered polyisocyanates are also suitable. Examples of these are 1,1,6,6-tetramethyl-hexamethylene diisocyanate, 1,5-dibutyl-penta-methyldiisocyanate, p- or m-tetramethylxylylene diisocyanate and the appropriate hydrated homologues.

In principle, diisocyanates can be converted by the usual method to higher functional compounds, for example, by trimerization or by reaction with water or polyols, such as, for example, trimethylolpropane or glycerine. The polyisocyanates can also be used in the form of isocyanate-modified resins.

The polyisocyanate cross-linking agents can be used individually or in combination.

The polyisocyanate cross-linking agents are those commonly used in the paint industry, and are described in detail in the literature and are also obtainable commercially.

The coating compositions may contain in addition one or more compounds or binders D) which contribute towards the solids content of the coating composition. Examples of additional binders are physically drying resins or resins which may be chemically cured by reactions other than the addition reaction of isocyanate groups with groups reactive with isocyanate groups.

The molar ratio of groups reactive towards isocyanate groups of the cross-linking agent B), in particular the hydroxyl or thiol groups from the at least one compound A) to the isocyanate groups from the at least one cross-linking agent B), are for example, 0.5:1 to 3:1, in particular 0.7:1 to 2:1.

The coating compositions can have a solids content of, for example, 40 to 85 wt. %, preferably 45 to 75 wt. %.

The coating compositions furthermore contain water and/or at least one organic solvent. The water-based coating compositions contain, for example, 30-60% by weight of water, and possibly small amounts of organic solvents, e.g., up to 15% by weight, preferably, up to 10% by weight based on the entire coating composition.

The organic solvents are solvents conventionally used in coating techniques. These may originate from the preparation of the binders or are added separately. Examples of suitable solvents are monohydric or polyhydric alcohols, e.g., propanol, butanol, hexanol; glycol ethers or esters, for example, diethylene glycol dialkyl ether, dipropylene glycol dialkyl ether, each with C1- to C6-alkyl, ethoxypropanol, butyl glycol; glycols, for example, ethylene glycol, propylene glycol, N-methyl pyrrolidone and ketones, e.g., methyl ethyl ketone, acetone, cyclohexanone.

The coating compositions can contain pigments, fillers and/or usual coating additives. All colour and/or special effect-giving pigments of organic or inorganic type used in paints are suitable for pigments. Examples of inorganic or organic colour pigments are titanium dioxide, micronized titanium dioxide, iron oxide pigments, carbon black, azo pigments, phthalocyanine pigments, quinacridone or pyrrolopyrrole pigments. Examples of special effect pigments are metal pigments, for example, from aluminum or copper, interference pigments, such as, for example, aluminum coated with titanium dioxide, coated mica, and graphite effect pigments. Examples of fillers are silicon dioxide, barium sulfate, talcum, aluminum silicate and magnesium silicate.

The additives are additives usually used in the paint industry. Examples of such additives are light stabilizers, for example, based on benztriazoles and HALS (hindered amine light stabilizer) compounds, flow control agents based on (meth)acrylic homopolymers or silicon oils, rheology-influencing agents, such as, highly disperse silicic acid or polymeric urea compounds, thickeners, such as, cross-linked polycarboxylic acid or polyurethanes, anti-foaming agents, wetting agents, and photoinitiators. The additives are added in the usual amounts familiar to the person skilled in the art. Even if not preferred, apart from catalyst compound C) the coating composition may contain further conventional curing catalysts.

The water-based coating composition can be produced by conventional methods. It can preferably be produced as follows:

The main binder A) is produced in the aqueous phase or is produced in an organic phase and subsequently converted into the aqueous phase by forming an aqueous dispersion or emulsion. The aqueous dispersion or emulsion of the main binder A) is mixed with the aqueous catalyst compound C). For example, a ratio of solids content binder A) to solids content binder compound II) of 7:1 to 99:1, preferably of 10:1 to 50:1 can be used. The mixture thus produced can subsequently be completed with the further paint components, such as additives and/or pigments. It is then mixed with the cross-linking component B) shortly before application.

The catalyst compound contemplated herein can be used in coating compositions for the production of single-layer coatings or for the production of one or more coating layers within a multilayer coating, such as, in particular, an automotive multilayer coating, either on an automotive body or on an automotive body part. This may relate to both original and repair coating applications. The coating compositions may in particular be used in pigmented form for the production of a primer layer or a single stage top coat layer or in pigment-free form for the production of an outer clear top coat layer or a transparent sealing layer of a multilayer coating. They may, for example, be used for the production of a clear top coat layer on a previously applied color-imparting and/or special effect-imparting pre-dried base coat layer.

The coating compositions may be applied by means of conventional application methods, in particular, by spraying onto any desired uncoated or pre-coated substrate, for example, of metal or plastics. After application the coating layer is preferably initially flashed off, to remove water and optionally organic solvent. Flash-off times of 10 to 40 minutes, preferably of 15 to 30 minutes, can be used.

The applied coating layer is then cured by the catalyzed cross-linking reaction of the cross-linkable binder A) and the cross-linker B). Curing may proceed at ambient temperature, e.g. at 20° C., or preferably at temperatures of, for example, 30 to 150° C., in particular of 40 to 80° C., within, for example, 5 to 30 minutes (complete drying time including flash-off time and curing time: about 30 to 45 minutes). Curing can be performed, for example, by heat or radiation, e.g. by IR radiation.

It is assumed that the catalyst is present in the aqueous phase in the oil droplets formed by the binder compound II), and thus, is separated from the oil droplets formed by main binder A). If the difference between the glass transition temperature Tg of binder compound II) and the temperature of application and/or curing is sufficiently large, the catalyst I) is inactive or less active before application and becomes active to catalyze the curing reaction during and/or after film formation and/or during curing.

Surprisingly, it has been found that acceptable short total drying times (flash-off time+drying time) can be achieved when using the catalyst compound. Coatings are achieved without surface defects appearing in the resulting paint film. Water-based coating compositions can, for example, be processed with flash-off times of approximately 20 minutes at ambient temperature and drying times of approximately 10 minutes at 60° C., without any losses with regard to the surface quality and the hardness. The total drying time is roughly the same as usual for corresponding coating compositions of prior art while guaranteeing an acceptable pot life. The reduced curing time allows to extend the flash-off time while maintaining the same total drying time. Extending the flash-off time on the other hand leads to better surface appearance without pinholes.

The improved pot life of the coating compositions enhanced by the use of the catalyst compound contemplated herein is also advantageous. Generally a rapid reaction occurs between the hydroxyl-functional and/or thiol-functional binder and the polyisocyanate cross-linking agent when mixed with one another, in particular when a curing catalyst is present. The pot life of the coating compositions after mixing components A and B and catalyst compound C) amounts, for example, to up to 4 hours.

EXAMPLES

Example 1

Preparation of Binder Compound II) ((meth)acrylic Copolymer)

In a reactor with a propeller type of stirrer, a thermometer, a condenser and a monomer/initiator feeding system 327 grams of Cardura E10 (Glycidylester of C10 versatic acid available from Hexion) and 109 grams of EPR were loaded and heated to about 145° C. A mixture of 147 grams acrylic acid, 17 grams of HEMA, 263 grams of styrene, 75 g of isobornyl methacrylate, 65 grams of Cardura E10, 17 grams of dicumyl peroxide and 136 grams of EPR was added over 2.5 hours to the reactor while keeping the temperature at 145° C. After the feed, the reactor was held 1 hour at 145° C. Then a mixture of 90 grams of HEMA, 61 grams of acrylic acid, 280 grams of IBMA, 270 grams of isobornyl methacrylate, 9 grams of dicumyl peroxide and 50 grams of EPR were added over 2.5 hours at 145° C., followed by a rinsing step for the feed system of 66 grams of EPR. After the rinsing step, the contents of the reactor were kept for 4.5 hours at 145° C.

Test Results

Solids content: 79.3%
Acid value: 44.5 mg KOH/g solids
Hydroxy value: 85 mg KOH/g solids (calculated)
Glass transition temperature Tg: 42° C.
(measured by DSC at a heating rate of 10K/min; Tg=TgEE as
defined in standard DIN 53 765)

Example 2

2.1 Preparation of Catalyst Compound a)

In a reactor with a propeller type of stirrer, a thermometer, a condenser and a dropping funnel 2000 grams of binder compound II) prepared according to Example 1 was heated to 95°. Then 15.9 grams of dibutyl tin dilaurate (1.6×10−5 mol/g solids of II) were added and homogenized within 20 minutes. Then 100.3 grams of dimethylethanolamine were added and homogenized within 15 minutes. Then 2400 grams of deionised water were added over 60 minutes and the solids content of the resin was adjusted with another 240 grams of deionised water.

Test Results

Solids: 35.6%
Acid value: 45.1 mg KOH/g solids
MEQ amine: 69.7 meq/100 g 2.2 Preparation of Catalyst Compound b)

In a reactor with a propeller type of stirrer, a thermometer, a condenser and a dropping funnel 1810 grams of binder component C2 prepared according to Example 1 were heated to 95°. Then 33.5 grams of Tyzor ZEC® (Available from DuPont®) (2.5*10−5 mol/g solids of I) were added and homogenized within 20 minutes. Then 91.2 grams of dimethylethanolamine were added and homogenized within 15 minutes. Then 2300 grams of deionised water were added over 60 minutes.

Test Results

Solids: 34.7%
Acid value: 45.2 mg KOH/g solids
MEQ amine: 71.6 meq/100 g

Example 3

Preparation of Binder Component A)

In a reactor with a propeller type of stirrer, a thermometer, a condenser and a monomer/initiator feeding system 200 grams of Cardura E10 (Glycidylester of C10 versatic acid available from Hexion) and 90 grams of EPR were loaded and heated to about 150° C. A mixture of 68 grams acrylic acid, 52 grams of HEMA, 160 grams of styrene, 40 grams of Cardura E10, 10 grams of dicumyl peroxide and 40 grams of EPR was added over 2.5 hours to the reactor while keeping the temperature at 150° C. After the feed, the reactor was held 1 hour at 150° C. Then a mixture of 108 grams of HEMA, 30.4 grams of acrylic acid, 142 grams of IBMA, 5 grams of dicumyl peroxide and 45 grams of EPR were added over 2.5 hours at 150° C., followed by a rinsing step for the feed system of 5 grams of EPR. After the rinsing step, the contents of the reactor was kept for 2 hours at 150° C. The reactor content was cooled to 100° C. and 100 grams of EPR were distilled off. In a next step 33 grams of dimethylethanolamine were added for a theoretical acid value of 20.5, the amount corrected for the measured acid value.

The polymer blend was diluted with 865 grams of water preheated at about 70° C.

Test Results

Solids: 45.1%
Acid value: 33.6 mg KOH/g solids
Hydroxy value: 154 mg KOH/g solids (calculated)
pH: 8.2
EPR: Ethoxy propanol; HEMA: Hydroxyethyl methacrylate; IBMA: Isobutyl methacrylate; BGA: Butylglycolacetate

Example 4

Preparation of Clear Coat Compositions

4.1 With Catalyst Compound a)

69.7 grams of binder A) prepared according to Example 3, 10.0 grams of catalyst compound a) prepared according to example 2.1 and 6.3 grams of butoxy propanol were mixed together as base paint. The hardener was obtained by mixing together 19.6 grams of Desmodur® XP 2410 and 4.9 grams of BGA. After mixing together base paint and hardener the activated paint was diluted with 31 grams of water to application viscosity.

4.2 With Catalyst Compound b)

76.9 grams of binder A prepared according to Example 3, 1.0 grams of catalyst compound b) prepared according to example 2.2 and 6.93 grams of butoxy propanol were mixed together as base paint. The hardener was obtained by mixing together 19.6 grams of Desmodur® XP 2410 and 4.9 grams of BGA. After mixing together base paint and hardener the activated paint is diluted with 32 grams of water to application viscosity.

4.3 Comparison: without Catalyst 77.8 grams of binder A prepared according to Example 3 and 6.93 grams of butoxy propanol were mixed together as base paint. The hardener was obtained by mixing together 19.6 grams of Desmodur® XP 2410 and 4.9 grams of BGA. After mixing together base paint and hardener the activated paint is diluted with 20 grams of water to application viscosity.

4.4 Comparison: with Free Catalyst 77.8 grams of binder A prepared according to Example 3 and 6.93 grams of butoxy propanol were mixed together as base paint. The hardener was obtained by mixing together 19.6 grams of Desmodur® XP 2410, 6.4 milligrams of Tyzor ZEC® and 4.9 grams of BGA. After mixing together base paint and hardener the activated paint is diluted with 21 grams of water to application viscosity.

Example 5

Application of Clear Coats

The clear coat compositions and comparative clear coat compositions 4.1 to 4.4 have been applied with a doctor blade to glass panels in a resulting dry film thickness of about 40 µm. Drying performance has been determined via pendulum hardness after 10-30 min flash-off time and curing at 60° C. within 30-10 min.

Measurement results are given in Table 1.

TABLE 1

| Example | CC 4.1 | CC 4.2 | CC 4.3 (Comparison) | CC 4.4 (Comparison) |
|---|---|---|---|---|
| Flash off time | 30 min | 30 min | 30 min | 30 min |
| Cure time | 10 min | 10 min | 10 min | 10 min |
| Hardness* after: | | | | |
| 1 h | 19 | 17 | 9 | 11 |
| 2 h | 26 | 24 | 13 | 16 |
| 3 h | 37 | 34 | 25 | 28 |
| 4 h | 47 | 46 | 38 | 37 |
| 24 h | 126 | 126 | 108 | 107 |
| 7 d | 138 | 139 | 104 | 114 |

*Pendulum hardness determined according to DIN EN ISO 1522: 2006

As can be seen from the results in Table 1 use of the clear coat compositions contemplated herein leads, in the same overall drying time, to coatings with earlier hardness and improved hardness development. Specifically the coating compositions CC 4.1 and 4.2 show a higher initial hardness (1 hour after cure) and a higher final hardness (7 days after bake). The CC 4.3 without catalysts shows less hardness due to low reactivity. The free catalysts gives also lower hardness.

The development of the NCO content of the activated paint is shown in Table 2.

TABLE 2

| Example | CC 4.1 | CC 4.2 | CC 4.3 (Comparison) | CC 4.4 (Comparison) |
|---|---|---|---|---|
| 0 h | 2.17 | 2.28 | 2.47 | 2.01 |
| 1 h | 1.98 | 2.13 | 2.33 | 1.89 |
| 2 h | 1.78 | 2.07 | 2.30 | 1.75 |
| 3 h | 1.75 | 1.91 | 2.17 | 1.55 |
| 4 h | 1.62 | 1.75 | 1.75 | 1.41 |

It is shown, that the NCO-consumption for the encapsulated catalysts is slower than for the free catalyst. A slower NCO consumption on the other hand means a longer pot life. The initial determination of the NCO content at time "0 hours" includes a sample preparation time of about 10 minutes. In case of the composition with the free catalyst the NCO consumption has started immediately after mixing reactive components A) and B) while the NCO consumption in the coating compositions contemplated herein is slowed down. After 4 hours the NCO consumption in the coating compositions contemplated herein is comparable with the NCO consumption of the non-catalyzed coating composition.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A catalyst composition for water-based two-component coating compositions comprising:
   an aqueous phase mixture of I) an organo-metal catalyst for a curing reaction between isocyanate groups and functional groups reactive towards isocyanate groups including for curing a reaction between at least one crosslinkable binder having at least one functional group reactive towards the isocyanate groups and at least one cross-linking agent having at least one free isocyanate group, and II) an oligomeric or polymeric binder compound having a glass transition temperature Tg of 20 to 70° C., measured by DSC (differential scanning calorimetry) at a heating rate of 10 K/min, wherein one or more ionic groups of the oligomeric or polymeric binder compound are neutralized with a neutralizing agent, wherein the organo-metal catalyst is immobilized in the oligomeric or polymeric binder compound, wherein the catalyst is present in the aqueous phase in oil droplets formed by the oligomeric or polymeric binder compound II), and wherein the oil droplets are separate from the at least one crosslinkable binder and the at least one cross-linking agent.

2. The catalyst composition of claim 1, wherein the glass transition temperature Tg of the binder compound II) is above the temperature at which a water-based two-component coating composition comprising the catalyst composition is applied.

3. The catalyst composition of claim 1, wherein the glass transition temperature of the binder compound II) is at least 10° C. above the temperature at which a water-based two-component coating composition comprising the catalyst composition is applied.

4. The catalyst composition of claim 3, wherein the glass transition temperature of the binder compound II) is at least 20° C. above the temperature at which a water-based two-component coating composition comprising the catalyst composition is applied.

5. The catalyst composition of claim 1, wherein the glass transition temperature Tg of the binder compound II) is 30 to 65° C.

6. The catalyst composition of claim 1, comprising 0.05 to 20% by weight of catalyst I) and 99.95 to 80% by weight of binder compound II), wherein the percentages by weight are based on the total amount of the catalyst composition.

7. The catalyst composition of claim 6, comprising 0.1 to 10% by weight of catalyst I) and 99.9 to 90% by weight of binder compound II), wherein the percentages by weight are based on the total amount of the catalyst composition.

8. The catalyst composition of claim 1, wherein the catalyst I) comprises a metal salt and/or a metal complex of organic compounds.

9. The catalyst composition claim 8, wherein the metal complex comprises ligands selected from the group of beta-diketones, alkyl acetoacetates, alcoholates, and combinations thereof.

10. The catalyst composition of claim 9, wherein the metal complex comprises aluminum, titanium, zirconium or hafnium.

11. The catalyst composition of claim 8, wherein catalyst I) is an organo-tin carboxylate.

12. The catalyst composition of claim 1, wherein the binder compound II) is a (meth)acrylic copolymer, a polyester or a combination thereof.

13. The catalyst composition of claim 1, wherein the organo-metal catalyst comprises a ligand selected from the group of beta-diketones, alkyl acetoacetates, alcoholates, and combinations thereof, and a metal selected from the group consisting of aluminum, titanium, zirconium, hafnium, and combinations thereof, and wherein the oligomeric or polymeric binder compound has the glass transition temperature Tg of 30 to 65° C.

14. A process for preparing a catalyst compound for water-based two-component coating compositions, the process comprising the steps of:

1) Preparing an oligomeric or polymeric binder compound having a glass transition temperature Tg of 20 to 70° C., measured by DSC (differential scanning calorimetry) at a heating rate of 10 K/min ("binder compound II)") in an organic medium by forming an organic solution or dispersion of the binder compound II) in one or more organic solvents, 2) Mixing the organic solution or dispersion of the binder compound II) with an organo-metal catalyst for a curing reaction between isocyanate groups and functional groups reactive towards isocyanate groups including for curing a reaction between at least one crosslinkable binder having at least one functional group reactive towards the isocyanate groups and at least one cross-linking agent having at least one free isocyanate group ("catalyst I)"), and 3) Converting the mixture of catalyst I) and binder compound II) into an aqueous phase by forming an aqueous dispersion or emulsion, wherein one or more ionic groups of the binder compound II) are neutralized prior to or during the conversion into the aqueous phase, wherein the catalyst I) is immobilized in the binder compound II), wherein the catalyst is present in the aqueous phase in oil droplets formed by the binder compound II), and wherein the oil droplets are separate from the at least one crosslinkable binder and the at least one cross-linking agent.

15. A method for applying a two-component coating composition containing a catalyst compound to a substrate, the method comprising the steps of:

preparing an oligomeric or polymeric binder compound having a glass transition temperature Tg of 20 to 70° C., measured by DSC (differential scanning calorimetry) at a heating rate of 10 K/min ("binder compound II)") in an organic medium by forming an organic solution or dispersion of the binder compound II) in one or more organic solvents;

mixing the organic solution or dispersion of the binder compound II) with an organo-metal catalyst for a curing reaction between isocyanate groups and functional groups reactive towards isocyanate groups including for curing a reaction between at least one crosslinkable binder having at least one functional group reactive towards the isocyanate groups and at least one cross-linking agent having at least one free isocyanate group ("catalyst I)");

converting the mixture of catalyst I) and binder compound II) into an aqueous phase by forming an aqueous dispersion or emulsion, wherein one or more ionic groups of the binder compound II) are neutralized prior to or during the conversion into the aqueous phase, and wherein the catalyst I) is immobilized in the binder compound II), wherein the catalyst is present in the aqueous phase in oil droplets formed by the binder compound II), and wherein the oil droplets are separate from the at least one crosslinkable binder and the at least one cross-linking agent;

applying the aqueous phase to a substrate; and drying and curing the aqueous phase, wherein curing comprises reacting the at least one crosslinkable binder with the at least one cross-linking agent in the presence of the catalyst I).

* * * * *